United States Patent [19]

Minagawa et al.

[11] 4,160,762

[45] Jul. 10, 1979

[54] HALOGEN-CONTAINING RESIN STABILIZER COMPRISING AN ALKOXYCARBONYLALKYLENETIN SULFIDE

[75] Inventors: Motonobu Minagawa, Koshigaya; Tetsuo Sekiguchi, Hasuda, both of Japan

[73] Assignee: Argus Chemical Corporation, Brooklyn, N.Y.

[21] Appl. No.: 806,528

[22] Filed: Jun. 14, 1977

[30] Foreign Application Priority Data

Jun. 14, 1976 [JP] Japan .................................... 51-69456

[51] Int. Cl.² .............................................. C08K 5/58
[52] U.S. Cl. ........................ 260/45.75 S; 252/400 R; 260/45.75 K; 260/23 XA
[58] Field of Search .................. 260/45.75 K, 45.75 S, 260/23 XA; 252/400 R

[56] References Cited

FOREIGN PATENT DOCUMENTS 2306208 3/1976 France.

*Primary Examiner*—V. P. Hoke
*Attorney, Agent, or Firm*—Otto S. Kauder

[57] ABSTRACT

Stabilizer compositions are provided to enhance the resistance to deterioration on heating of a halogen-containing resin, comprising (A) a sulfide compound of four-valent tin having linked to a tin atom at least one sulfide group, and through carbon 1 or 2 alkoxycarbonylalkylene groups having from 1 to 8 carbon atoms in the alkoxy group and from 2 to 3 atoms in the alkylene group; and (B) a tin mercaptoalkylenecarboxylic acid ester having linked to a tin atom through sulfur 2 or 3 mercaptoalkylenecarboxylic acid alkyl ester groups having 1 or 2 carbon atoms in the mercaptoalkylene group and 4 to 18 carbon atoms in the alkyl ester group, and through carbon 1 or 2 alkoxycarbonylalkylene groups having from 1 to 8 carbon atoms in the alkoxy group and 2 or 3 carbon atoms in the alkylene group. The stabilizer composition contains at lesast 5% by weight of the sulfide compound (A).

Halogen-containing resin compositions stabilized with the above stabilizer composition are also provided.

18 Claims, No Drawings

HALOGEN-CONTAINING RESIN STABILIZER COMPRISING AN ALKOXYCARBONYLALKYLENETIN SULFIDE

BACKGROUND OF THE INVENTION

This invention relates to halogen-containing resins having as the result of incorporation therein of a new stabilizer composition comprising at least two different compounds containing tin and sulfur greatly improved resistance to deterioration in color, processability and mechanical properties on exposure to elevated temperatures.

There is an enormous number of disclosures of tin compounds that have been used to stabilize halogen containing resins such as polyvinyl chloride, vinyl chloride copolymers, and other vinyl halide polymers. To illustrate the unmanageably large bulk of this literature, it might be noted that a 1959 review booklet by H. Verity Smith titled "The development of the Organotin Stabilizer" (published by Tin Research Institute, Greenford, England) listed over 100 patent disclosures of tin containing stabilizers for PVC, and more recently C. Stapfer in U.S. Pat. No. 3,830,751 of Aug. 20, 1974 listed over 500 individual tin containing compounds and L. Weisfeld in U.S. Pat. No. 3,887,519 of June 3, 1975 listed over 200 compounds that are all methyltin derivatives, i.e. compounds with at least one methyl group directly linked to tin, including for example dimethyltin sulfide. Overwhelmingly the tin containing stabilizers referred to in this literature are tin compounds having at least one hydrocarbon group linked to 4-valent tin through carbon, for example methyl, n-butyl, and n-octyl. The remarkably small number of disclosures of tin containing stabilizers other than 4-valent tin derivatives with at least one hydrocarbon group linked to tin are represented by J. Fincke U.S. Pat. No. 2,479,918 of Aug. 23, 1949, tetra(2-thienyltin); S. Caldwell U.S. Pat. No. 2,629,700 of Feb. 24, 1953, carboxylate salts of 2-valent (stannous) tin; W. Leistner U.S. Pat. No. 2,726,227 of Dec. 6, 1955, certain tetrahydrocarbon mercaptides of tin having only hydrocarbon groups linked to tin through sulfur; W. Considine in U.S. Pat. No. 3,412,120 of Nov. 19, 1968 disclosed cyanoalkylenetin sulfides having linked to tin one or two cyanoalkylene groups having two or more carbon atoms in the alkylene group made from tetrakis (cyanoalkylene) tin by halogenation or redistribution to the required cyanoalkylenetin halide; Considine also showed in U.S. Pat. No. 3,454,609 of July 8, 1969 that when cyanoalkylenetin compounds were hydrolyzed, polymeric propionatotin compounds were obtained. Akzo N.V. in Netherlands Specification No. 74-12230 of Mar. 16, 1976 disclosed functional substituted organotin trihalides prepared from stannous halide, hydrogen halide, and carbonyl group activated olefins of the type $R_1R_2C=CR_3R_4$ where at least one R group is an activating group with a carbonyl radical adjoining the double bond and the other R groups are hydrogen or alkyl groups, and converted to mercaptoester type stabilizers; Akzo N.V. Netherlands Specification No. 75-03116 of Sept. 17, 1976 functional substituted organotin dihalides prepared from tin metal, hydrogen halide, and carbonyl group activated olefins of the type $R_1R_2C=CR_3R_4$ where at least one R group is an oxygen containing group with a carbonyl group adjoining the double bond and the other R groups are hydrogen or alkyl groups, and converted to stabilizers by reaction with alkylthiocarboxylic acid esters, alkylthiols, monocarboxylic acids, or partial esters of dicarboxylic acids.

Pertinent to the evaluation of the present invention among the large number of known hydrocarbontin sulfur compounds are particularly the use of hydrocarbontin sulfides by E. Weinberg in U.S. Pat. Nos. 2,746,946 of May 22, 1956 and 2,789,103 of Apr. 16, 1957; and by M. Crauland in U.S. Pat. No. 3,108,126 of Oct. 22, 1963; alkylstannonic acids and alkylthiostannonic acids (i.e. monohydrocarbontin sulfides) by H. Frey in U.S. Pat. No. 3,021,302 of Feb. 13, 1962; cyclic dihydrocarbyltin salts of mercapto carboxylic acids by G. Mack in U.S. Pat. No. 3,027,350 of Mar. 27, 1962; thiobis(dihydrocarbontin) salts of carboxylic acids and dicarboxylic acid monoesters by A. Schroeder in U.S. Pat. No. 3,476,404 of Nov. 4, 1969; an organotin stabilizing agent obtained by reacting a compound of the formula $R-Sn-(X)_3$ wherein R is a hydrocarbon and X halogen, with a mixture of an alkali metal sulfide and (a) aliphatic alkali metal mercaptide or (b) an alkali metal salt of a saturated or unsaturated mono or polycarboxylic acid, by C. Dorfelt in U.S. Pat. No. 3,442,852 of May 6, 1969; organotin mercaptoacid ester sulfides having the formula:

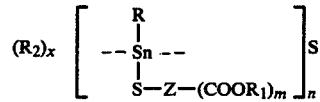

in which n is an integer from one to two, m is the number of $COOR_1$ groups, and is an integer from one to four, x is an integer from zero to one, R is a hydrocarbon radical having from about one to about eighteen carbon atoms, and preferably from four to eight carbon atoms, $R_1$ is an organic group derived from a monohydric or polyhydric alcohol of the formula $R(OH)_{n4}$, where $n_4$ is an integer from one to about four, but is preferably one or two; $R_2$ is R or SZ $(COOR_1)_m$; Z is a bivalent alkylene radical carrying the S group in a position alpha or beta to a $COOR_1$ group, and can contain additional free carboxylic acid, carboxylic ester, or carboxylic acid salt groups, and mercapto groups; and the Z radical has from one to about five carbon atoms, by O. Kauder in U.S. Pat. No. 3,565,930 of Feb. 23, 1971; reaction products of ogano-tin mercaptoacid derivatives having the formula

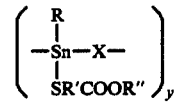

as well as $R_nSn(SR'COOR'')_{4n}$ and $(RSn(SR'COOR'')_2)_2X$ wherein R is an alkyl radical having up to 12 carbons, R'' is an alyl radical, R' is an alkylene group of at least 2 methylene groups, X is oxygen or sulfur, n is 1 to 3 and y designates the degree of polymerization, with an organotin oxide, a monohydrocarbyltin oxide, or a hydrocarbylstannoic acid or ester thereof, by L. Weisfeld in U.S. Pat. No. 3,576,785 of Apr. 27, 1971; and alkyltin polysulfide thioesters having the formula $(R_xSn)_n(-SR'COOR'')_{(4-x)n-2m}(-S_y)_m$ where the tin is tetravalent, R is alkyl of 1 to 8 carbon atoms or benzyl, R' is alkylene of 1 to 4 carbon atoms, R'' is alkyl of 1 to 18 carbon atoms or alkenyl of 2 to 18 carbon atoms, cycloalkyl having 5 to 6 carbon atoms in the ring, or benzyl, x is 1 or 2, y is 2 to 4, n is 1 to 10 and m is ½n to n, by T. Kugele in U.S. Pat. No. 3,869,487 of Mar. 4, 1975.

There have also been disclosures of the combined use of different kinds of stabilizers containing tin and sulfur. Thus C. Stapfer in U.S. Pat. No. 3,503,616 of Mar. 24, 1970 disclosed the use in PVC of a monoalkyltin sulfide and a dialkyltin sulfide. J. Gottlieb in U.S. Pat. No. 3,424,717 of Jan. 28, 1969 disclosed the use in PVC of a first stabilizer having the formula $(RSnX_{1.5})_n$ wherein R is alkyl having 1 to 20 carbon atoms, aryl, alkaryl, aralkyl, and cycloalkyl, and X is oxygen, sulfur, or a mixture of these, and n is 2–1000; a second stabilizer which is a 2,6-di substituted phenol with the substituents being branched alkyl groups having less than 10 carbon atoms; and a third stabilizer $R'_a Sn(SR'')_{4-a}$ where R' is hydrocarbon, R'' a residue of a carboxylic acid, a carboxylic ester, or a hydrocarbon, and a is 1 to 3. O. Kauder in U.S. Pat. No. 3,632,538 of Jan. 4, 1972 disclosed a stabilizer composition having a high concentration of tin, within the range from about 20 to about 35% Sn, comprising an organotin alpha- or beta-mercapto carboxylic ester and an organotin sulfide. The organic groups linked to tin in the organotin sulfide are hydrocarbon or heterocyclic groups; the organic groups linked to tin through carbon in the organotin mercapto acid esters are hydrocarbon groups having from about one to about eight carbon atoms. For best results at least one of the compounds of the combination should have only one hydrocarbon group per tin atom linked to tin through carbon. Similar compositions of organotin ester and sulfide are also disclosed by P. Hoye in U.S. Pat. No. 3,609,120 of Sept. 28, 1971. L. Weisfeld in U.S. Pat. No. 3,640,950 of Feb. 8, 1972 disclosed combinations of diorganotin compounds, particularly dialkyltin mercaptides, mercaptoesters, and mercapto acid salts, with small amounts of monohydrocarbyltin salts to eliminate a yellowish cast in halogenated vinyl resins stabilized with diorganotin salts alone. W. Mayo in U.S. Pat. No. 3,769,263 of Oct. 30, 1973 disclosed vinyl resin stabilized with a first stabilizer $(RSnX_{1.5})_n$ and a second stabilizer $R'_2Sn(SR'')_2$ wherein R, R', R'', and n are defined as in Gottlieb U.S. Pat. No. 3,424,717 already cited. L. Brecker in U.S. Pat. No. 3,787,357 of Jan. 22, 1974 disclosed homogeneous liquid stabilizers containing both a monoalkyltin mercaptocarboxylic acid ester and a dialkyltin mercaptocarboxylic acid ester together with a barium containing liquid in which barium carbonate is dispersed in an organic salt such as a barium alkylphenolate or alkylaromatic sulfonate acting as a liquefying agent for barium carbonate.

Throughout the cited disclosures of stabilizers containing more than one kind of organotin-sulfur compound, the organic groups linked to tin through carbon in these compounds are hydrocarbon groups.

SUMMARY OF THE INVENTION

In accordance with this invention, a stabilizer composition for enhancing the resistance to deterioration upon heating of a halogen-containing resin comprises (A) at least one sulfide compound of four-valent tin having linked to a tin atom at least one sulfide group, and through carbon from one to two alkoxycarbonylalkylene groups having from 1 to 8 carbon atoms in the alkoxy group and from 2 to 3 carbon atoms in the alkylene group; and (B) at least one tin mercaptoalkylenecarboxylic acid ester having linked to a tin atom through sulfur from 2 to 3 mercaptoalkylenecarboxylic acid alkyl ester groups having 1 to 2 carbon atoms in the mercaptoalkylene group and 4 to 18 carbon atoms in the alkyl ester group, and through carbon from 1 to 2 alkoxycarbonylalkylene groups having from 1 to 8 carbon atoms in the alkoxy group and from 2 to 3 carbon atoms in the alkylene group; the stabilizer composition contains at least 5% by weight of the sulfide compound (A). Quite small amounts of the stabilizer composition are effective, ranging from at least 0.01 part by weight to about 5 parts by weight of each ingredient per 100 parts by weight of halogen containing resin; the use level of the composition comprising both ingredients (A) and (B) is in the range from 0.1 to 5 parts by weight per 100 parts by weight of the resin, preferably from 0.5 parts to 3 parts by weight.

DESCRIPTION OF PREFERRED EMBODIMENTS

In the sulfide compound of tin which is component (A) of the stabilizer composition according to this invention, the term "sulfide" refers to the sulfide group , wherein a is 1 to 4, b is 1 to 2, c is 0 or 1 and the terminal valences are linked to the same tin atom or to different tin atoms. Each such tin sulfide compound contains per tin atom one or two alkoxycarbonylalkylene groups linked to tin through carbon and from one to four sulfide groups.

Thus the term "sulfide" includes monosulfides, disulfides, trisulfides, tetrasulfides, and carboxyalkylene sulfides.

The alkoxycarbonylalkylene group linked to tin through carbon has from one to about eight carbon atoms in the alkoxy group and from two to three carbon atoms in the alkylene group. Lower homologs with a single carbon atom in this alkylene group are unsatisfactory.

Sulfide compounds of tin having linked to tin only sulfide groups, and alkoxycarbonylalkylene groups linked to tin through carbon, can be defined by the formula:

$$[S_a(C_bH_{2b}CO_2)_cSn_d(C_eH_{2e}CO_2R)_2]_n$$

in which R is an alkyl group having from one to eight carbon atoms, a is an integer from 1 to 4, b is 1 or 2, c is 0 or 1, d is 1 or 2, e is 2 or 3, and n is from 1 to about 100, provided that when d is 2 a is at least 3.

The R groups are alkyl groups having from one to eight carbon atoms, for example methyl, ethyl, propyl, isopropyl, isobutyl, s-butyl, n-butyl, t-butyl, isohexyl, n-octyl, isooctyl, 2-ethylhexyl, and 2-octyl, n-amyl, and 2-methylbutyl.

When d in the above formula is one, the compound is a bis(alkoxycarbonylalkylene)tin sulfide, and R a, b, c, e, and n are as defined above. Thus the atomic ratio of sulfur to tin is from 1 to 1 to 4 to 1.

When in such a compound c is one, the compound is a bis(alkoxycarbonylalkylene) tin carboxyalkyl sulfide, for example bis(methoxycarbonylethylene)tin 2-carboxyethyl sulfide, bis(ethoxycarboxylethylene)tin carboxymethyl sulfide, and S,O-bis(thiomethoxycarbonylethylenetin)3-mercaptopropionate. The sulfide and carboxyl groups can be linked to the same tin atom or to different tin atoms.

When c is zero, a type of the compound has the recurring group

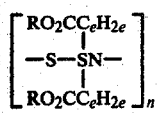

where n is the number of units in the chain, and ranges up to 100 and more.

Another way of defining the type $SSn(C_eH_{2e}CO_2R)_2$, i.e. a bis(alkoxycarbonylalkylene)tin sulfide in the above formula in which a is one and c is zero is

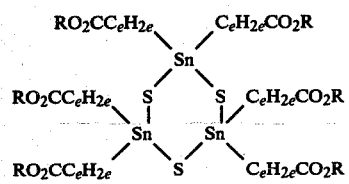

Exemplary of this type are: bis(2-methoxycarbonylethylene)tin sulfide trimer, bis(2-methoxycarbonylethylene)tin sulfide polymer, bis(2-methoxycarbonylpropylene)tin sulfide polymer, bis(2-propoxycarbonylethylene)tin sulfide polymer, and bis(2-ethoxycarbonylethylene)tin sulfide polymer.

The two alkoxycarbonylalkylene groups linked to tin in this type can be the same or different. Compounds where two different alkoxycarbonylalkylene groups are linked to tin through carbon include 2-methoxycarbonylethylene-2-methoxycarbonyl-2-methylethylene tin sulfide and 2-propoxycarbonylethylene-2-ethoxycarbonylethylene tin sulfide.

When in the above formula d is two, there is one alkoxycarbonylalkylene group linked to tin through carbon for each tin atom.

These mono(alkoxycarbonylalkylene)tin sulfides of this invention are polymers which can be illustrated by the formulae

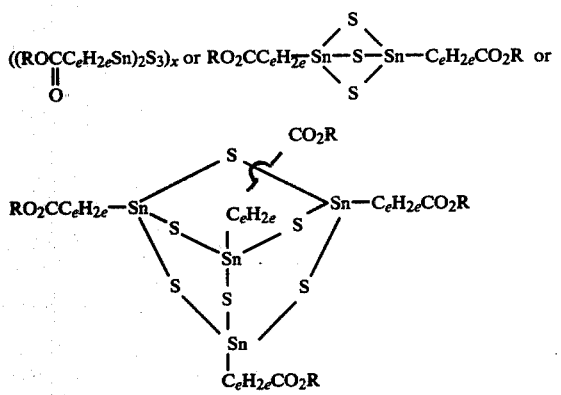

in which each tin atom is linked to three sulfur atoms and each sulfur is linked to two tin atoms, and x is a number from one to about 100.

Exemplary mono(alkoxycarbonylalkylene)tin sulfides of this type include 2-methoxycarbonylethylene tin sulfide polymer, 2-ethoxycarbonylpropylene tin sulfide polymer, 2-butoxycarbonylethylene tin sulfide polymer, and 2-isopropoxycarbonylethyl tin sulfide polymer.

The tin sulfide component A of the stabilizer composition of this invention can be prepared by a number of procedures. For example, hydrogen sulfide can be bubbled at about 40° C. into a slurry of alkoxycarbonylalkylene tin oxide in water or an organic solvent (such as methanol, acetone, or toluene). The insoluble oxide is converted to a solution or dispersion of the sulfide and the reaction is terminated when the entire system is liquefied.

The required alkoxycarbonylalkylene tin oxide can be obtained from an alkoxycarbonylalkylene tin halide by treatment with alkali bicarbonate as disclosed by S. Matsuda et al in Chemical Abstracts 1966, Vol. 65, 18612b. The halide can be made by the reaction of tin metal with an alkoxycarbonylalkylenating agent, for example an alkoxycarbonylalkylene halide (see S. Matsuda U.S. Pat. No. 3,440,255 of Apr. 22, 1969), or a hydrogen halide with an alkoxycarbonylalkene (see Netherlands Specification No. 75/03116 of September 18, 1976).

Avoiding the preparation and isolation of alkoxycarbonylalkylene tin oxide, during which a wasteful side reaction can remove the alkoxy group and precipitate a very insoluble carboxyalkylene tin salt, provides an even more useful technique i.e. the displacement of alkoxycarbonylalkylene tin halides (e.g. (MeOCOCH$_2$CH$_2$)$_2$SnCl$_2$ by an aqueous alkali metal sulfide or ammonium sulfide. (In this and following formulas Me represents a methyl group).

The above preparative methods can be summarized in the transformations below, where the methoxycarbonylethylene tin compounds shown are representative of the entire class of alkoxycarbonylalkylene tin compounds:

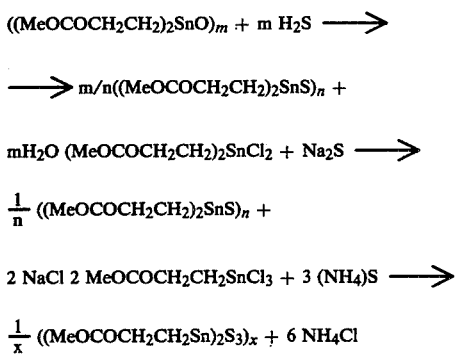

Carboxyalkylene sulfides are prepared by analogous transformations using a carboxyalkylene sulfide salt or acid starting material. These preparations are carried out in an aqueous or aqueous-alcoholic medium, from which the desired product separates as a solid or a separate liquid phase. A water-immiscible organic solvent can be used to take up the product as it forms and assist separation from the inorganic salt solution by-product; suitable solvents include hexane, heptane, toluene, xylene, chloroform, ethylene dichloride, ethyl acetate and butyl acetate. The alkoxycarbonylalkylenetin mercaptoalkylenecarboxylic acid ester component (B) of the stabilizer composition of this invention has linked to each 4-valent tin atom through carbon one or two alkoxycarbonylalkylene groups having 1 to 8 carbon atoms in the alkoxy group and two to three carbon atoms in the alkylene group, and through sulfur two or three mercaptoalkylenecarboxylic acid alkyl ester groups having four to eighteen carbon atoms in the alkyl group and one to two carbon atoms in the alkylene group. There are thus a total of four groups linked to each tin atom.

The alkoxycarbonylalkylenetin mercaptoalkylenecarboxylic acid ester can be defined by the formula:

$$ROOCC_eH_{2e}Sn(SC_bH_{2b}CO_2R')_2R''$$

in which R' is an alkyl group having four to eighteen carbon atoms, R" is $ROOCC_eH_{2e}$ or $SC_bH_{2b}CO_2R'$, and R, b, and e are as defined above.

R' alkyl groups can be for example isobutyl, n-butyl, s-butyl, isoamyl, n-hexyl, 2-ethylbutyl, n-heptyl, 2-ethylhexyl, n-octyl, isooctyl, 3,5,5-trimethylhexyl, isononyl, isodecyl, n-decyl, lauryl, cetyl, and n-octadecyl.

Alkoxycarbonylalkylenetin mercaptoalkylenecarboxylic acid esters that can be used include for example 2-methoxycarbonylethylenetin tris(butylthioglycolate), 2-ethoxycarbonylethylenetin tris(isooctylmercaptopropionate), 2-butoxycarbonylethylenetin tris(stearylmercaptopropionate), 2-methoxycarbonyl-2-methylethylenetin tris(n-octylthioglycolate), 2-methoxycarbonylethylenetin tris(2-ethylhexylmercaptopropionate), bis(2-methoxycarbonylethylene)tin bis(isooctylthioglycolate), bis(2-methoxycarbonylethylene)tin bis(2-ethylhexylthioglycolate), bis(2-methoxycarbonylethylene)tin bis(2-ethylhexyl-3-mercaptopropionate), bis(2-butoxycarbonylethylene)tin bis(butylthioglycolate), bis(2-methoxycarbonylethylene)tin bis(stearylthioglycolate), bis(2-ethoxycarbonylpropylene)tin bis(laurylthioglycolate), bis(2-isopropoxycarbonylethylene)tin bis(isooctylthioglycolate) and bis(2-n-octyloxycarbonylethylene)tin bis isobutyl 3-mercaptopropionate.

The alkoxycarbonylalkylene tin mercaptoalkylenecarboxylic acid esters can be prepared by reaction of a mercaptoalkylenecarboxylic acid ester, for example isooctyl 3-mercaptopropionate with an alkoxycarbonylalkylenetin oxide or an alkoxycarbonylalkylenetin halide together with an acid acceptor, for example sodium carbonate, ammonia, or potassium hydroxide.

The proportions of alkoxycarbonylalkylenetin sulfide (A) and alkoxycarbonylalkylenetin mercaptoalkylenecarboxylic acid ester (B) are such that the stabilizer composition contains at least 5% by weight of the sulfide component (A) and at least 5% of the alkoxycarbonylalkylenetin mercaptoalkylene carboxylic acid ester (B). Both components (A) and (B) can have one alkoxycarbonylalkylenetin group only linked to each tin atom, or both (A) and (B) can have each two alkoxycarbonylalkylene groups linked to each tin atom, or there can be one alkoxycarbonylalkylene group linked to each tin atom in one of the components (A) or (B) and two alkoxycarbonylalkylene groups linked to each tin atom in the other component of the stabilizer composition of this invention.

The preparation of alkoxycarbonylalkylenetin sulfide and alkoxycarbonylalkylenetinmercaptoalkylenecarboxylic ester components of the stabilizer of this invention can be illustrated by the following examples:

EXAMPLE 1

Mono-ethoxycarbonylethylene-tin sulfide

A dispersion of 65.2 g (0.2 mole) ethoxycarbonylethylenetin trichloride in 75 ml of water and 75 ml ethanol was warmed to 55° C. and a solution of 23.4 g (0.3 mole) sodium sulfide in 60 ml water was added from a dropping funnel with vigorous stirring. A warm water bath was used to keep the temperature of the reaction mixture between 60° and 75° C. The pH of the reaction mixture was measured periodically and the addition of the sodium sulfide solution was terminated when the pH had reached 6.2, at which time less than 1 ml remained in the dropping funnel. Stirring was continued for 2 hours at 60°–65° C. and then while cooling to about 25° C. The product accumulated as a fine powder and was collected on a filter, washed with water and dried. The product had melting point 111°–121° C. and infra-red absorption at 1680, 1720, and 1190 kaysers (in decreasing order of peak intensity), and analyzed 43.8% tin; $(C_2H_5OCOCH_2CH_2Sn)_2S_3$ requires 44.5% Sn.

EXAMPLE II

Bis(ethoxycarbonylethylene)tin sulfide

To a solution of 78.4 L g (0.2 mole) bis(ethoxycarbonylethylene)tin dichloride in 160 ml toluene was added 15.6 g (0.2 mole) sodium sulfide as a 40% aqueous solution, while warming the mixture to maintain 85°–90° C. After the completion of the reaction, the layers were separated and the toluene solution of the product vacuum stripped to give the product as a viscous liquid, with refractive index 1.573 at 25° C. and infra-red absorption peaks at 1700, 1660, and 1190. The product analyzed 33.9% tin, $(C_2H_5OCOCH_2CH_2)_2SnS$ requires 33.7% Sn.

EXAMPLE III

Mono-n-octoxycarbonylethylenetin sulfide

The procedure of Example I was followed with the substitution of n-octoxycarbonylethylenetin trichloride as the starting material. A solid product was obtained with melting point 95°–103° C., infra-red absorption at 1680, 1720, and 1180, and 33.0% tin analysis; $(C_8H_{17}OCOCH_2CH_2Sn)_2S_2$ requires 33.9% Sn.

EXAMPLE IV

Bis(ethoxycarbonylethylene)tin S-(2-carboxyethylene)sulfide

To a solution of 3-mercaptopropionic acid 21.2 g (0.2 mole) in 30 ml water at 40° C. was added 78.4 g (0.2 mole) bis(ethoxycarbonylethylene)tin dichloride with 60 ml 95% ethanol, followed by 21.8 g potassium hydroxide in 180 ml water. A gummy solid separated during the addition of the potassium hydroxide. The supernatant liquid was removed and the remaining solid washed with four 200 ml portions of warm (55° C.) water and then allowed to air dry. There was obtained 72 g of pale tan solid.

EXAMPLE V

Bis(methoxycarbonylethylene)tin S-(carboxymethylene)sulfide

PART A

Bis(methoxycarbonylethylenetin)dibromide 90.2 g (0.2 mole) was stirred into iso-octyl thioglycolate 81.6 g (0.4 mole) at 60° C., followed by 16 g sodium hydroxide (0.4 mole) dissolved in 80 ml of warm water. The temperature during the addition was controlled at 60°–70° C. After the completed addition the mixture was stirred for 1 hour at 58°–63° C. and the layers separated. The upper layer containing the bis(methoxycarbonylethylene)tin bis(isooctyl thioglycolate) was vacuum dried to 86° C. and 20 mm and filtered from a small quantity of solid. The filtrate was a pale yellow liquid with refractive index 1.508 at 25° C. and tin analysis 16.42%; for $(CH_3OCOCH_2CH_2)_2$ Sn—$(SCH_2COOC_8H_{17})_2$ 17.0% Sn is calculated.

PART B

To 21 g (0.03 mole) of the above bis(methoxycarbonylethylene)tin bis(isooctyl thioglycolate) 3 g (about 10% excess) thioglycolic acid was added dropwise. A white precipitate formed and was collcted on a filter, and washed first with three portions of hexane and then with acetone, and dried. The resulting bis(methoxycarbonylethylene)tin S-carboxymethylene sulfide had melting point 190° to 200° C. and analyzed 29.9% Sn. $(CH_3COCH_2CH_2)_2Sn(SCH_2CO_2)$ requires 31.1% Sn.

Stabilizer compositions according to this invention can be in solid, liquid, or paste form. Certain alkoxycarbonylalkylenetin sulfide compounds and most of the alkoxycarbonylalkylenetin mercaptoalkylenecarboxylic acid ester components of the stabilizer compositions are liquids and miscible with one another. Those that are solids can frequently be solubilized in liquid components to give liquid solutions, if necessary helped by heating to accomplish dissolution within a convenient period of time, that remain homogeneous and liquid at ambient temperatures without separation.

In addition to the essential alkoxycarbonylalkylenetin sulfide and alkoxycarbonylalkylenetin mercaptoalkylenecarboxylic acid ester components in the stabilizer composition of this invention, there can be included if desired phenolic antioxidants such as BHT, thiodipropionate esters such as dimethyl, dilauryl, ditridecyl and distearyl thiodipropionates, and epoxidized esters, such as epoxy soybean oil, epoxylinseed oil, and isodecyl epoxystearate. Comprehensive disclosures of phenolic, and thiodipropionate sterilizers in U.S. Pat. No. 3,849,370 column 16 line 49 to column 22 line 65, and epoxide ester stabilizers by M. Minagawa in U.S. Pat. No. 3,869,324 column 26 lines 12 to 39 are here incorporated by reference. Stabilizer - lubricant combinations can include such lubricants as paraffin wax, microcrystalline wax, oxidized montan wax esters, long chain aliphatic alcohols having 14 to 40 carbon atoms, and mineral oil.

Non-limiting examples of liquid homogeneous stabilizer compositions that can be prepared in accordance with this invention are shown in Table 1-A.

TABLE 1-A

| No. | INGREDIENTS | GRAMS | HEATED AT °C. | HOURS |
|---|---|---|---|---|
| 1 | 2-Ethoxycarbonylethylenetin sesquisulfide | 20 | | |
| | bis(2-ethoxycarbonylethylene)-tin bis(2-ethylhexyl)thioglycolate | 70 | | |
| | Dilauryl thiodipropionate | 8 | | |
| | Bisphenol A | 2 | 70 | 2 |
| 2 | 2-Methoxycarbonylethylenetin sesquisulfide | 27 | | |
| | bis(2-methoxycarbonylethylene)tin-bis(isooctyl 3-mercaptopropionate) | 73 | 70 | 2 |
| 3 | 2-n-Butoxycarbonylethylenetin sesquisulfide | 35 | | |
| | n-butoxycarbonylethylenetin-tris-(n-dodecyl 3-mercaptopropionate) | 65 | | |
| | barium neodecanoate | 10 | | |
| | 1,1,3-tris(2-methyl-4-hydroxy-5-t-butylphenyl)butane | 3 | | |
| | Epoxysoybean oil | 87 | 55 | 3 |
| 4 | 2-Methoxycarbonylethylenetin 2-carboxyethylenesulfide | 33 | | |
| | Bis(2-methoxycarbonylethylene)tin-bis(isooctyl thioglycolate) | 48 | | |
| | 2-methoxycarbonylethylenetin tris (isooctyl thioglycolate) | 18 | 65 | 2 |
| 5 | 2-Ethoxycarbonylethylenetin 1-carboxyethylenesulfide | 40 | | |
| | Bis(2-methoxycarbonylethylene)-tin bis(isooctyl thioglycolate) | 45 | | |
| | BHT Antioxidant | 15 | 65 | 2 |
| 6 | Bis(n-butoxycarbonylethylene)tin-sulfide | 32 | | |
| | n-butoxycarbonylethylenetintris-(isodecyl 3-mercaptopropionate) | 68 | 40 | 1 |
| 7 | Bis(2-ethylhexyloxycarbonylethylene)-tin sulfide | 50 | | |
| | Bis(2-ethylhexyloxycarbonylethylene)-tin 2-carboxyethylene sulfide | 20 | | |
| | Bis(2-ethylhexyloxycarbonylethylene)-tin bis(2-ethylhexyl thioglycolate) | 30 | 40 | 1 |
| 8 | 2-Methoxycarbonylethylenetin sesquisulfide | 39 | | |
| | Bis(2-methoxycarbonylethylene)tin bis(isooctyl 3-mercaptopropionate) | 61 | 70 | 2 |
| 9 | 2-Methoxycarbonylethylenetin sesquisulfide | 51 | | |
| | bis(2-methoxycarbonylethylene)tin bis(isooctyl 3-mercaptopropionate | 49 | 70 | 2 |

TABLE 1-A-Continued

| No. | INGREDIENTS | GRAMS | HEATED AT °C. | HOURS |
|---|---|---|---|---|
| 10 | 2-Methoxycarbonylethylenetin 2-carboxyethylene sulfide | 21 | | |
| | Bis(2-methoxycarbonylethylene)tin bis(isooctyl thioglycolate) | 79 | 65 | 2 |
| 11 | Bis(2-methoxycarbonylethylene)tin 2-carboxyethylene sulfide | 47 | | |
| | Bis(2-methoxycarbonylethylene)tin bis(isooctyl thioglycolate) | 50 | | |
| | Technical White Oil | 20 | | |
| | Cetyl-stearyl alcohol | 3 | 65 | 2 |

Non-limiting examples of stabilizer and stabilizer-lubricant compositions that are solid at ambient (20°–30° C.) temperatures in accordance with this invention are shown in Table 1-B.

TABLE 1-B

| No. | INGREDIENTS | GRAMS | HEATED TO °C. | HOURS |
|---|---|---|---|---|
| 12 | 2-Methoxycarbonylethylenetin sesquisulfide | 15 | | |
| | Bis(2-methoxycarbonylethylene-tin)-bis(n-hexadecyl 3-mercaptopropionate) | 65 | | |
| | Calcium stearate | 20 | 55 | 4 |
| 13 | Bis(2-Methoxycarbonylethylene)tin carboxymethylene sulfide | 55 | | |
| | Bis(2-n-octyloxycarbonylethylene)-tin bis(2-ethylhexylthioglycolate) | 20 | | |
| | Barium stearate | 15 | | |
| | BHT Antioxidant | 5 | 40 | 3 |
| 14 | Bis(2-ethoxycarbonylethylene)tin sulfide | 12 | | |
| | 2-ethoxycarbonylethylenetin tris-(n-octadecyl 3-mercaptopropionate) | 74 | | |
| | Magnesium behenate | 14 | 60 | 2 |

Non-limiting examples of stabilizer and stabilizer-lubricant compositions in paste form at ambient temperature according to this invention are shown in Table 1-C.

TABLE 1-C

| 15 | Bis(n-butoxycarbonylethylene)tin sulfide | 9 | | |
|---|---|---|---|---|
| | n-butoxycarbonylethylenetin tris(isooctylthioglycolate) | 61 | | |
| | Paraffin wax m. 70°–73° C. | 30 | 60 | 1 |
| 16 | Bis(2-methoxycarbonylethylene) tin 2-carboxyethylene sulfide | 16 | | |
| | Bis(2-methoxycarbonylethylene)-tin bis(isooctylthioglycolate) | 24 | | |
| | 2-methoxycarbonylethylene)tin tris(isooctylthioglycolate) | 24 | | |
| | Calcium stearate | 10 | | |
| | $C_{22}$ to $C_{28}$ linear alcohol mixture | 26 | 60 | 3 |
| 17 | 2-ethylhexyloxycarbonylethylene-tin sesquisulfide | 22 | | |
| | Bis(2-ethylhexyloxycarbonylethylene) tri bis(2-ethylhexyl 3-mercaptopropionate) | 44 | | |
| | 1,4-butanediol ester of oxidized montan wax acids | 34 | 55 | 2 |

Halogen-containing resins stabilized with the composition of this invention include polyvinylchloride, polyvinylbromide, polyvinylfluoride, polyvinylidene chloride, chlorinated polyethylene, chlorinated polypropylene, fluorinated polyethylene, chlorinated rubber, vinylchloridevinylacetate copolymer, vinylchloridethylene copolymer, vinylchloride-propylene copolymer, vinylchloride-styrene copolymer, vinylchloride-isobutylene copolymer, vinylchloride-vinylidene chloride copolymer, vinylchloride-styrene-maleic anhydride terpolymer, vinylchloridestyrene-acrylonitrile copolymer, vinylchloride-butadiene copolymer, vinylchloride-isoprene copolymer, vinylchloride-chlorinated propylene copolymer, vinylchloride-vinylidene chloride-vinylacetate terpolymer, vinylchloride-acrylic acid ester copolymer, vinylchloride-maleic acid ester copolymer, vinylchloride-methacrylic acid ester copolymer, vinylchloride-acrylonitrile copolymer, internally plasticized polyvinyl chloride, or blends of such resins with alpha-olefin polymers such as polyethylene, polypropylene, polybutene, poly-3-methylbutene, or copolymer such as ethylene-vinylacetate, and ethylene-propylene; copolymers of styrene with another monomer (for example, maleic anhydride, butadiene, acrylonitrile); acrylic resins such as acrylonitrile-butadiene-styrene copolymer, acrylic acid ester-butadiene-styrene copolymer, and methacrylic acid ester-butadiene-styrene copolymer.

The preparation of the stabilized polymer composition is easily accomplished by conventional procedures. In PVC, for example, the selected stabilizer combination along with such compounding ingredients as plasticizers, colors, lubricants, antistatic agents etc. as may be needed, is blended with the polymer being stabilized, using, for instance, plastic mixing rollers, at a temperature at which the mix is fluid and thorough blending facilitated, typically at from 250°–350° F. for a time sufficient to form a homogeneous sheet, five minutes, usually. After the mass is formed, it is sheeted off in the usual way.

The following examples in the opinion of the inventors represent preferred embodiments of their invention.

EXAMPLES 1 to 3

Stabilization of a polyvinyl bromide latex.

Liquid stabilizers were blended into a 48% solids polyvinyl bromide latex (source: Ethyl Corp., Baton Rouge, La.), using 2.5 g of each stabilizer to 100 g latex. Portions of 3 grams latex containing stabilizers were weighed into 30 ml aluminum dishes and heated 15 minutes in a 110° C. oven to drive off the water and produce a film. The dishes each containing a polymer film were then heated in an air circulating oven at 163° C. or at 150° C. The samples were viewed at 2 minute intervals and the time until a deep purple or brown discoloration was observed taken as the oven life of the sample. Results of the test are shown in Table 2.

TABLE 2

| EXAMPLE | (2.5 g/100 g latex) STABILIZER COMPOSITION | 163° C. OVEN LIFE IN MINUTES | 150° C. OVEN LIFE IN MINUTES |
| --- | --- | --- | --- |
| Control A | NONE | 0* | 0* |
| Control B | Unspecified organotin compound (commercially stabilized latex) | 2 | 5 |
| 1 | Bis(2-methoxycarbonylethylene)tin sulfide, 0.4 Bis(2-methoxycarbonylethylene)tin bis(2-ethylhexyl thioglycolate)2.1 | 6 | 16 |
| 2 | Bis(2-methoxycarbonylethylene)tin carboxyethylene sulfide, 0.7 2-methoxycarbonylethylenetin tris-(2-ethylhexyl thioglycolate) 1.8 | 12 | 20 |
| 3 | Bis(2-methoxycarbonylethylene)tin 2-carboxyethylene sulfide 0.5 2-methoxycarbonylethylenetin tris-(2-ethylhexyl 3-mercaptopropionate) 1.0 Epoxidized soybean oil 1.0 | 9 | 23 |

*Not oventested because the sample was discolored purple after the drying step at 110° C.

The test results demonstrate the greatly superior stabilization of polyvinyl bromide latex that can be achieved with the stabilizer composition of the invention. The observed oven life of samples containing stabilizer compositions according to this invention is sufficient to protect the polymer from discoloration and release of damaging acid when applied and cured on textile fabric for use as a flame retardant.

EXAMPLES 4 to 6

Stabilization of rigid polyvinyl chloride sample sheets were prepared by hand-mixing 100 parts by weight of polyvinyl chloride (Geon 103EP) with 3 parts acrylic processing aid, 1 part of a blue tint masterbatch (containing 1% by weight oil-soluble blue dye and 99% PVC), and 0.5 parts of calcium stearate lubricant along with 1.5 part of stabilizer composition, fluxing the mixture on a 2-roll mill at 170° C. for 3 minutes and pressing the rough sheet off the mill for 5 minutes at 295° C. and 150 kg/square cm pressure. The pressed sheet samples were oven tested at 190° C. and viewed at 5 minute intervals. Discharge of the blue tint or the appearance of a yellow or gray discoloration were taken as signs of failure. Results are shown in Table 3.

TABLE 3

| EXAMPLE | STABILIZER COMPOSITION 1.5 parts per 100 parts PVC | 190° oven test minutes |
| --- | --- | --- |
| Control C | Dimethyltinbis(isooctyl thioglycolate) | 10 |
| Control D | Methyltintris (isooctyl thioglycolate) | 10 |
| Control E | Dimethyltin and monomethyltin isooctyl thioglycolates 1.0 + 0.5 parts | 15 |
| 4 | Bis(2-Ethoxycarbonylethylene)tin 2-carboxyethyl sulfide 0.5 Bis(2-Ethoxycarbonylethylene)tin bis(n-hexyl thioglycolate)1.0 | 20 |
| 5 | n-Octoxycarbonylethylenetin sesquisulfide 0.75 Bis(Methoxycarbonylethylene)tin bis(isooctyl 3-mercaptopropionate 0.75 | 20 |
| 6 | Bis(2-Methoxycarbonylethylene)tin sulfide 0.2 2-Methoxycarbonylethylenetin tris (isooctyl thioglycolate) 1.3 | 20 |

The examples demonstrate the superior stabilizing effectiveness of the compositions of this invention. While blue tint is used in plastic to hide yellow and other off colors, only a very small extent of discoloration is sufficient to overcome the tint and even accentuate the objectionable color change. This makes the stability test in the presence of blue tint an extremely sensitive and severe test for good stabilizers.

EXAMPLES 7 to 9

Stabilization of ABS-PVC polymer blend.

Milling stability tests were carried out with blends of 80 parts polyvinyl chloride (Geon 103 EP 8) and 20 parts ABS polymer (Kane Ace B-28). Calcium stearate 0.5 part was used as lubricant in all samples. The mill was kept at 165°±2° C. and the stock temperature rose gradually from 150° C. immediately after banding to about 182° C. coinciding with the development of a noticeable yellow color and then more rapidly to about 195° C. The time to a noticeable yellow color and to sticking to the mill, i.e. the inability to remove a sample without scraping, was noted. Results are shown in Table 4.

TABLE 4

| EXAMPLE | STABILIZER COMPOSITION (phr) | MILL TEST TO ADHERE | TIME (min.) TO DISCOLOR |
| --- | --- | --- | --- |
| Control F | Bis(n-butoxycarbonylethylene)tin bis(isooctyl 3-mercaptopropionate)(1.5) | 10 | 10 |

TABLE 4-Continued

| EXAMPLE | STABILIZER COMPOSITION (phr) | MILL TEST TO ADHERE | TIME (min.) TO DISCOLOR |
|---|---|---|---|
| Control G | n-butoxycarbonylethylenetin tris(isooctyl--3-mercaptopropionate) (1.5) | 7 | 10 |
| Control H | Bis(n-butoxycarbonylethylene)tin bis (isooctyl 3-mercaptopropionate 1.35 n-butoxycarbonylethylenetin tris(isooctyl-3-mercaptopropionate) 0.15 | 8 | 13 |
| Example 7 | Bis(n-butoxycarbonylethylene)tin 2-carboxyethylene sulfide 0.6 Bis(n-butoxycarbonylethylene)tin bis(isoctyl-3-mercaptopropionate) 0.6 | 12 | 17 |
| Example 8 | Bis(n-butoxycarbonylethylene)tin 2-carboxyethylene sulfide 0.4 n-butoxycarbonylethylenetin tris(isooctyl-3-mercaptopropionate) 1.0 | 13 | 15 |
| Example 9 | n-butoxycarbonylethylenetin sesquisulfide 0.4 n-butoxycarbonylethylenetin tris(isooctyl-3-mercaptopropionate) 1.0 | 11 | 14 |

The results of the test show the improved effect on mill stability of the ABS-PVC blends of the stabilizer compositions of this invention compared to known stabilizers and stabilizer combinations.

We claim:

1. A stabilizer composition for enhancing the resistance to deterioration upon heating of a halogen-containing resin comprising (A) at least one sulfide compound of four-valent tin having linked to a tin atom at least one sulfide group and through carbon from one to two alkoxycarbonylalkylene groups having from 1 to 8 carbon atoms in the alkoxy group and from 2 to 3 carbon atoms in the alkylene group and represented by the formula $$[S_a(C_bH_{2b}CO_2)_cSn_d(C_eH_{2e}CO_2R)_2]_n$$

and (B) at least one tin mercaptoalkylenecarboxylic acid ester having linked to a tin atom through sulfur from 2 to 3 mercaptoalkylenecarboxylic acid alkyl ester groups and 4 to 18 carbon atoms in the alkyl ester group, and through carbon from 1 to 2 alkoxycarbonylalkylene groups having from 1 to 8 carbon atoms in the alkoxy group and from 2 to 3 carbon atoms in the alkylene group and represented by the formula $$ROOCC_eH_{2e}Sn(SC_bH_{2b}CO_2R')_2R''$$

in which formulae R is an alkyl group having from 1 to 8 carbon atoms, R' is an alkyl group having from 4 to 18 carbon atoms, R'' is $-C_eH_{2e}CO_2R$ or $-SC_bH_{2b}CO_2R'$, a is an integer from 1 to 4, b is 1 or 2, c is 0 or 1, d is 1 or 2, e is 2 or 3, n is from 1 to about 100, provided that when d is 2 a is at least 3, the stabilizer composition containing at least 5% by weight of the sulfide compound (A).

2. A stabilizer composition according to claim 1 in which the sulfide compound is represented by the formula:

$$[S_a(C_bH_{2b}CO_2)_cSn_d(C_eH_{2e}CO_2R)_2]_n$$

in which a is 3 and d is 2.

3. A stabilizer composition according to claim 1 in which the sulfide compound is represented by the formula $$[S_a(C_bH_{2b}CO_2)_cSn_d(C_eH_{2e}CO_2R)_2]_n$$

in which d is 1.

4. A stabilizer composition according to claim 2 in which the tin mercaptoalkylenecarboxylic acid ester is represented by the formula $$ROOCC_eH_{2e}Sn(SC_bH_{2b}CO_2R')_2R''$$

in which R'' is $-C_eH_{2e}CO_2R$.

5. A stabilizer composition according to claim 3 in which the tin mercaptoalkylenecarboxylic acid ester is represented by the formula $$ROOCC_eH_{2e}Sn(SC_bH_{2b}CO_2R')_2R''$$

in which R'' is $-SC_bH_{2b}CO_2R'$.

6. A stabilizer composition according to claim 1 in which the sulfide compound (A) is ethoxycarbonylethylenetin sulfide represented by the formula $$((CH_3CH_2O\overset{O}{\underset{\|}{C}}C_2H_4Sn)_2S_3)_x$$

where x is a number from 1 to about 100.

7. A stabilizer composition according to claim 1 in which the sulfide compound (A) is bis(ethoxycarbonylethylene)tin sulfide.

8. A stabilizer composition according to claim 1 in which the sulfide compound (A) is n-octyloxycarbonylethylenetin sulfide represented by the formula $$((n-C_8H_{17}O\overset{O}{\underset{\|}{C}}C_2H_4Sn)_2S_3)_x$$

where x is a number from 1 to about 100.

9. A stabilizer composition according to claim 1 in which the tin mercaptoalkylenecarboxylic acid ester (B) is 2-methoxycarbonylethylenetintris(isooctyl thioglycolate).

10. A stabilizer composition according to claim 1 in which the tin mercaptoalkylenecarboxylic acid ester (B) is 2-methoxycarbonylethylenetris(n-Octadecyl 3-mercaptopropionate).

11. A stabilizer composition according to claim 1 in which the tin mercaptoalkylenecarboxylic acid ester (B) is bis(2-ethoxycarbonylethylene)tin bis (2-ethylhexyl thioglycolate).

12. A stabilizer composition according to claim 1 containing as an additional ingredient a compound selected from the group consisting of epoxidized vegetable oil, alkaline earth metal and magnesium salts of monocarboxylic acids having 6 to 30 carbon atoms, hydrocarbon substituted monohydric phenols having 10 to 30 carbon atoms, and barium salts thereof.

13. A stabilizer composition according to claim 1 in the form of a visually clear homogeneous liquid.

14. A halogen-containing resin composition having enhanced resistance to deterioration upon heating comprising a halogen-containing resin and a stabilizer composition according to claim 1.

15. A halogen-containing resin composition according to claim 14 in which the quantity of stabilizer composition is 0.1 to 5 parts by weight per 100 parts of halogen-containing resin.

16. A halogen-containing resin composition according to claim 14 in which the halogen-containing resin is a vinyl chloride polymer.

17. A composition according to claim 16 in which the halogen-containing resin is a homopolymer of vinyl chloride.

18. A halogen-containing resin composition according to claim 14 in which the halogen-containing resin is a vinyl bromide polymer.

* * * * *